June 10, 1941.   D. G. NELSON   2,245,220
BARBECUE APPARATUS
Filed July 8, 1938
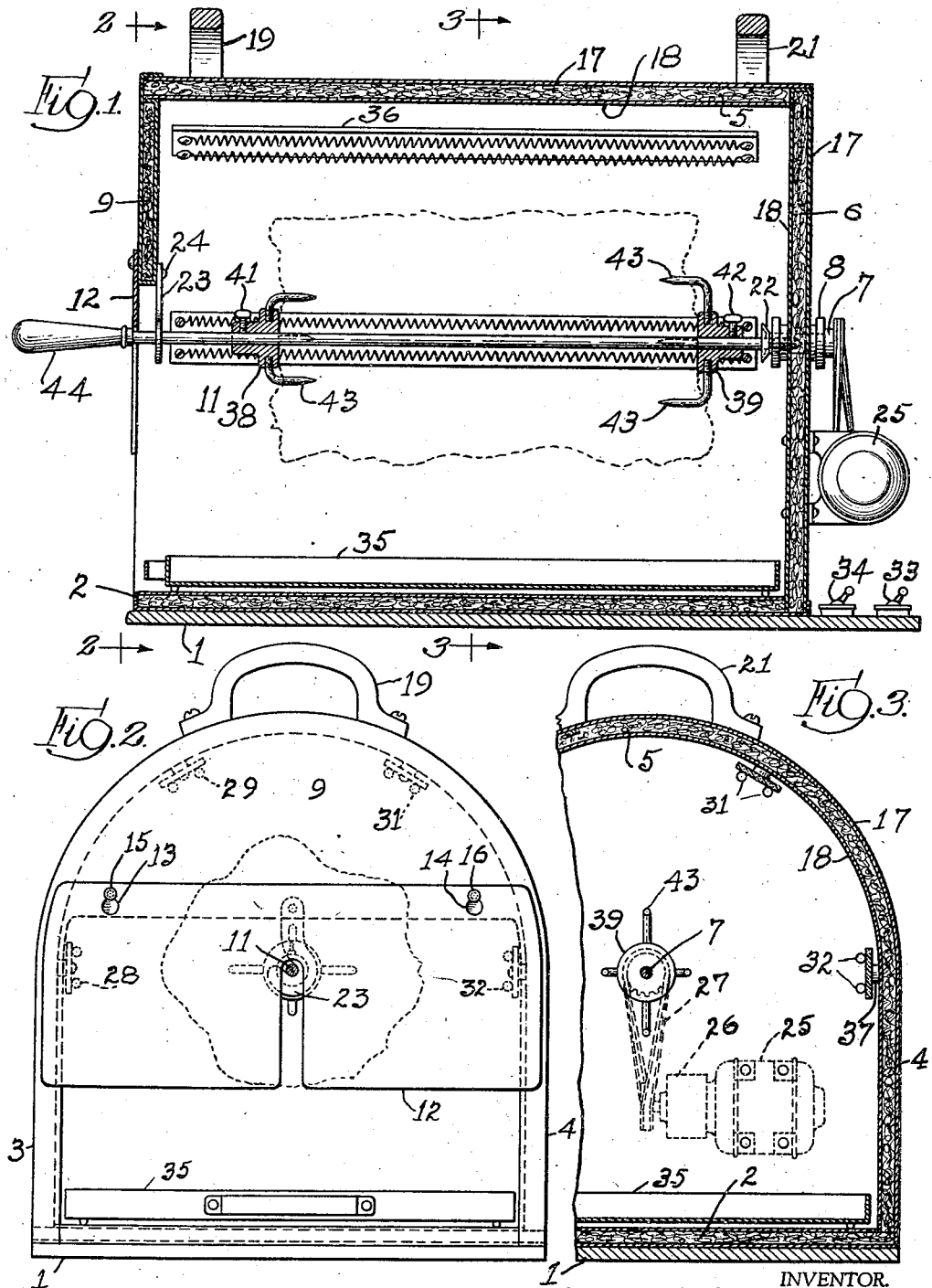
INVENTOR.
Daniel G. Nelson,
BY Frank J. Foley
ATTORNEY.

Patented June 10, 1941

2,245,220

UNITED STATES PATENT OFFICE 2,245,220

BARBECUE APPARATUS

Daniel G. Nelson, Chicago, Ill.

Application July 8, 1938, Serial No. 218,237

15 Claims. (Cl. 219—35)

This invention relates to an apparatus for barbecuing meat by means of electrically generated heat.

The most common forms of barbecue apparatus provide an open fire over which or adjacent to which meat on a slowly rotating spit is suspended. In such an apparatus heat is applied only to that surface of the meat which is facing the source of heat. The opposite side of the meat, which often constitutes more than half of the total surface, is exposed to the low temperature of the surrounding atmosphere and rapidly gives up heat and moisture.

In other devices for roasting meat on rotating spits, the spit is sometimes confined in a chamber where all of the steam escaping from the meat is retained in the confined atmosphere. Cooking of a meat in a very moist atmosphere gives a much different result than would the roasting of the same meat in a dry atmosphere.

Other devices purposely provide a considerable draft of air past the meat on the rotating spit, resulting in wastage of heat and undue drying of the meat.

This invention, however, aims to roast meat on a rotating spit by electrically produced heat in a still atmosphere free from drafts and retaining only a small portion of the generated steam in the vicinity of the roasting meat. The result is the production of a flavor not otherwise obtainable and a tenderness in the meat difficult to duplicate in any other manner.

Another advantage resulting from the use of this invention is that the loss of weight is held within reasonable limits while the speed and efficiency of cooking is greatly increased over that which is obtained in ovens which have a considerable air circulation.

In order to obtain the above advantages this invention utilizes an insulated chamber with electrical heating coils spaced about the spit in such a manner as to expose approximately all of the entire surface of the meat to direct radiation from the coils, while the entire surface is rotating through the highly heated atmosphere of the chamber.

Another object of the invention is to provide a chamber whose upper wall surfaces are so shaped as to radiate and reflect heat directly toward the center line of the spit and which are located in sufficiently close proximity to the spit as to secure the maximum efficiency.

Another object of the invention is to provide a chamber whose walls are so shaped as to reflect heat—not only against the longitudinal sides of a piece of meat impaled on the spit, but also on both ends of the piece of meat. Another object of the invention is to provide a chamber closed at the longitudinal sides of the chamber, relative to the axis of the spit, closed at one end and having an aperture at the other end only in the lower portion thereof to restrict the escape of heat, to minimize air circulation and yet at the same time permit the escape of vapor from the lower portion of the chamber to prevent excessive accumulation of water vapor.

Another object of the invention is to provide an apparatus possessing all of the above named and other advantages and yet so simple in construction and in mode of operation that it may be manufactured economically and used effectively without the exercise of any great amount of skill.

Other objects and advantages of the invention inherently possessed by it will become apparent from a perusal of this specification.

In the drawing

Fig. 1 is a longitudinal center sectional view of the device.

Fig. 2 is a sectional view on the line 2—2 of Fig. 1.

Fig. 3 is a sectional view of the line 3—3 of Fig. 1.

Referring further to the drawing, the device is provided with a base 1 and preferably an insulated bottom layer 2. Extending upwardly from the base are the insulated side walls 3 and 4, which merge into the curved insulated ceiling indicated as 5. At one end there is provided an imperforate insulated wall 6, through which a shaft 7 for rotating the spit and a bearing 8 for the shaft extend but in sealed relation with that wall to prevent the admission or escape of air. At the front end of the chamber an insulated wall 9 extends downwardly to a position which is preferably slightly above the level of the spit 11. A removable baffle 12 is removably connected in any suitable manner, so that it may be positioned substantially as shown to cooperate with the wall 9 in closing approximately the upper two-thirds of the front end of the chamber. The baffle plate 12 and the wall 9 not only pocket and prevent the escape of heated air from the upper portion of the chamber but they also serve to reflect heat against the outer end of a piece of meat which is secured on the spit, thus assuring adequate roasting of this outer end. If desired, this plate may be provided with slots 13 and 14 to facilitate hanging the plate on pins 15 and 16.

Preferably the walls should be heavily insulated as shown with some such insulation as spun glass or some other suitable heat insulator which will minimize heat losses through the walls and each of these walls is preferably provided with an outer layer of metal such as 17 and an inner layer such as 18 as indicated Fig. 1, the inner layer serving not only to retain the insulation in position but also acting importantly as a heat reflector. Instead of metal, however, some other suitable rigid heat reflecting surface may be used on the inside.

Handles 19 and 21 may also be provided as shown to facilitate carrying the device.

Any suitable means for connecting the spit 11 to the shaft 7 may be employed. One form, which is shown, consists in providing threads at the inner pointed end of the spit which will screw into the interiorly threaded shaft 7, a funnel shaped member 22 being provided to facilitate locating the end of the spit in the shaft. The outer end of the spit may be supported as shown by resting it in a slot provided in the lower end of the pivoted hook 23, the hook being pivoted at 24 on the inside surface of the wall 9.

A small electric motor 25 with suitable speed reducing gears (not shown) but located at 26 may be employed to drive the shaft 7. Either a direct drive may be employed or a belt such as 27 may be utilized.

To provide the heat, I prefer to employ 4 coils placed as shown at 28, 29, 31 and 32. These coils when thus placed will radiate heat directly upon nearly the entire longitudinal surfaces of the piece of meat, although all of the coils are out of the way of any fat which may drip from the meat. Thus the piece of meat, throughout its entire length, is subject to direct heat radiation and to reflected heat from the side walls of the chamber. The end walls of the chamber reflect heat against both ends of the meat.

Preferably a switch 33 may be employed to control the motor and supply current to one of the coils whereby a small amount of heat may be maintained in the chamber to keep the meat warm after the barbecuing has been completed. The other switch 34 may be used if desired to supply current to the other three coils so that when both switches are closed all four coils will be heated and produce the maximum temperature in the chamber.

A drip pan 35 may be placed at the bottom of the chamber to catch the drippings from the meat. Each of the coils is preferably mounted on a strip 36 of material such as hardened asbestos serving both as an insulator for the heating elements and also as a heat reflector. These strips should be slightly separated from the inner wall 18 to minimize the heat loss by means of studs such as 37.

In order to facilitate the securing of a piece of meat on the spit, I prefer to provide skewers in the form of blocks such as 38 and 39 which may be secured in any position on the spit by means of set screws 41 and 42. Each of these blocks will carry a plurality of pointed prongs such as 43 for engaging and retaining the meat.

The handle 44 at the outer end of the spit is placed outside of the chamber during the operation of the device. Hence it will always be cool enough to be gripped.

The dimensions of the chamber will of course depend upon the size of the roasts that are contemplated being supported on the spit. For the sake of economy and efficiency, and to secure the greatest economy and effectiveness, the chamber walls should not be too remote from the surface of the roast, yet sufficient clearance should be provided to accommodate the irregular outlines of the meat and prevent undue searing of the surface of the meat by reason of the proximity of the coils.

The device is operated as follows:

The skewer 38 is first placed on the spit after which the piece of meat is pierced longitudinally by the spit. The other skewer is then arranged on the spit and both of them forced toward each other and locked in place by means of the set screws. The spit is then engaged with the shaft 7 and its outer end is dropped into the slot in the pivoted hook 23. The removable plate 12 may then be placed in position and switches 33 and 34 closed to start the operation of the device. During the slow rotation of the spit the fat exuding from the surface of the meat continuously keeps the exterior of the roast adequately basted, the excess dropping into the pan 35. No further attention need be paid to this device until the necessary amount of time has elapsed after which time all the heat may be cut off or a small amount may be maintained with one coil and with the motor rotating to secure uniformity of heat application, until the roast is ready to be served.

Through ample experience with this device it has been ascertained that the barbecuing of a roast of any kind of meat in a device constructed in accordance with this invention yields a roasted product superior in flavor and tenderness to anything which can be produced by any other cooking device. Excessive steaming and excessive drying is eliminated. This device does not require as high a temperature at the heat source as is necessary in other devices. Yet the cooking time for any type of roast is gratifyingly short. The uniformity of application of heat throughout the entire surface of the roast appears to give superior results in basting and in the retention of flavor in the meat.

While four longitudinally extending heating elements are shown in the drawing, a greater or lesser number may be used, having in mind, however, the object of supplying heat to the entire length and ends of the roast as uniformly as is practicable.

It should be understood that the drawing and specification show and describe merely a preferred embodiment of the invention and that variations may be made in the details of construction without departing from the spirit and scope of the invention defined in the following claims.

Having shown and described the invention, I claim:

1. A barbecue apparatus comprising a chamber having insulated side walls and an insulated top wall closed against the admission of air, a wall at one end likewise closed against the admission of air, the chamber being open only at the opposite end and having a baffle extending downwardly from the top wall of the chamber substantially closing said opposite end downwardly to a level approximating the lowest expected extent of a roast supported on the spit, a spit extending through said chamber, means extending through the closed end wall of the chamber for rotating the spit, means secured at the open end of the chamber for supportig the outer end of the spit, and a plurality of electrical heating elements extending longitudinally of the chamber and located at various angular positions relatively to the spit, the end of the chamber below the baffle having an opening of substantial size for the free diffusion of excess vapor from the chamber.

2. A barbecue apparatus comprising an elongated chamber having insulated side walls and an insulated top wall, a spit extending longitudinally of said chamber, said side walls and top wall being curved from the horizontal plane of the spit to form a heat reflecting surface substantially equally distant from the spit at all points above said horizontal plane, an imperforate wall at one end of said chamber, means for supporting the inner end of the spit, means for rotating the spit, all three of said walls being closed against the admission of air, a baffle at the other end of the chamber extending downwardly from the top wall to a level approximating the lowest expected level of the lowermost portion of a roast supported on the spit, closing that end of the chamber to that level and leaving an opening therebelow adequate for the free escape of excess vapors from the chamber, means at the latter end of the chamber for supporting the outer end of the spit, and electrical heating elements extending longitudinally within said chamber and positioned at spaced intervals about said spit to provide heat sources above the spit and laterally thereof substantially at its horizontal plane.

3. A barbecue apparatus comprising an elongated chamber having insulated side and top walls and an insulated wall at one end, all of said walls being joined and imperforate to exclude air, a spit extending longitudinally of the chamber centrally thereof, means for rotating the spit, longitudinally extending electrical heating elements arranged on the chamber ceiling above and on the side walls laterally of the spit, the opposite end of the chamber being substantially closed by a heat reflecting baffle extending from the ceiling of the chamber downwardly to a level approximating the lowest expected level of the lowermost portion of a roast supported on the spit, the last said end of the chamber being open below said baffle to an extent sufficient for the free escape of excess vapors from said chamber.

4. A barbecue apparatus comprising an elongated chamber having insulated side and top walls and an insulated wall at one end, all of said walls being joined and imperforate to exclude air, a spit extending longitudinally of the chamber centrally thereof, means for rotating the spit, longitudinally extending electrical heating elements arranged on the chamber ceiling above and on the side walls laterally of the spit, the opposite end of the chamber having a heat reflecting baffle partially closing the end extending from the ceiling to a level approximating the lowest expected level of the lowermost portion of a roast supported on the spit, the last said end of the chamber being open below said baffle to an extent adequate for the free escape by diffusion of excess vapor in said chamber, the heating elements, side walls, end walls and ceiling being constructed and arranged to provide during operation of the device a substantially uniform supply of radiated and reflected heat to all portions of the exterior of a roast mounted on the spit.

5. A barbecue apparatus comprising a chamber having a rotatable spit mounted therein and heat reflecting walls surrounding the spit above it and on all sides thereof, the chamber having no openings for the entry or escape of air except at a level below a roast supported on the spit, and electrical heating elements disposed in said chamber at a plurality of radial positions relatively to the spit, at least one chamber wall below said level having one or more openings of sufficient area to permit the free escape by diffusion of excess vapor from the chamber.

6. A barbecue apparatus comprising a chamber having a rotatable spit mounted therein and heat reflecting walls surrounding the spit above it and on all sides thereof, the chamber having but one opening for the entry or escape of air and that one being located at a level below the level of the bottom of a roast supported on the spit, said opening being of substantial size to permit the free escape of excess vapor from the chamber and electrical heating elements disposed in the chamber at a plurality of radial positions about the spit.

7. A barbecue apparatus comprising an elongated chamber having a rotatable spit positioned horizontally and centrally therein and heat reflecting walls positioned for surrounding a roast supported on the spit above it and on all sides thereof, the chamber having but one opening for the entry or escape of air and that one located at one end of the chamber at a level below the level of the bottom of the roast on the spit, and electrical heating elements disposed in the chamber at a plurality of radial positions about the spit, the chamber being provided with an opening below the bottom of a roast of size sufficient for the free escape by diffusion of vapor from said chamber.

8. A barbecue apparatus comprising a chamber having a rotatable spit positioned therein and heat reflecting walls extending longitudinally of the position of a roast on the spit above, below and at the sides thereto, heat reflecting walls at opposite ends of the spit, the chamber being substantially free from openings to the atmosphere excepting at a level below the level of the lowermost portion of the roast, and electrical heating elements mounted in the chamber at a plurality of radially spaced positions surrounding the spit, the chamber being provided with an opening below the bottom of a roast of size sufficient for the free escape by diffusion of vapor from said chamber.

9. A barbecue apparatus comprising a chamber having a rotatable spit positioned therein and heat reflecting walls positioned for surrounding a roast mounted on the spit at all sides and at both ends thereof, the chamber walls being substantially free of openings except at a level below the level of the lowermost portion of the roast and being provided with opening means to facilitate the entry or removal of the spit with a roast carried thereon, and electrical heating elements disposed in the chamber at a plurality of positions surrounding the spit, the chamber being provided with an opening below the bottom of a roast of size sufficient for the free escape by diffusion of vapor from said chamber.

10. A barbecue apparatus comprising a chamber having a rotatable spit positioned therein and heat reflecting walls positioned for surrounding a roast mounted on the spit upon all sides and at the ends of the roast, electrical heating elements disposed at a plurality of radial positions about said spit, all of said walls being substantially imperforate except one end wall, said end wall being constructed to provide a heat reflecting surface opposite one end of the roast and an opening only below the bottom of the roast, a portion at least of said end wall construction being removable to permit the entry or removal of a roast mounted on said spit, said opening being of a size sufficient for the free escape by diffusion of excess vapor from said chamber.

11. A barbecue apparatus comprising an elongated chamber having a rotatable spit mounted longitudinally therein, the side walls, one end wall and the top and bottom walls being substantially imperforate to exclue air, the other end wall being imperforate except for an opening confined to a level below the level of the bottom of a roast on the spit during the operation thereof, the last said end wall being constructed and arranged to have a portion thereof removable for temporarily increasing the size of said opening to facilitate the entry or removal of a roast carried on said spit, and electrical heating elements in said chamber disposed relatively to the spit to cooperate with said walls to radiate and reflect heat upon the sides and ends of a roast carried on the spit, said opening being large enough during the operation of the device to afford free escape by diffusion of vapor from said chamber.

12. A barbecue apparatus comprising a rotatable spit, a chamber constructed for surrounding the spit, shaped and positioned to constitute an inverted air trap for hot air and vapors and having walls substantially imperforate from the top down to a level approximating the lowermost portion of a roast supported on the spit, a bottom wall, at least one of said walls below said level having one or more apertures of a size ample for the free escape by diffusion of excess vapor accumulating within the upper portion of the chamber, and electrical heating means within the chamber above said level.

13. A barbecue apparatus comprising a rotatable spit, a bottom wall or closure member, a chamber constructed for surrounding the spit on all sides thereof and constituting an inverted trap for hot air and vapors and having substantially imperforate walls from the top down to a level approximating the lowest portion of a roast supported on the spit, the wall surfaces being constructed and arranged to provide below said level one or more openings to the atmosphere of a total area adequate for the free escape by diffusion of excess vapor trapped within the upper interior of said chamber, and electrical heating means positioned within the chamber.

14. An apparatus in accordance with claim 13 having a detachable spit, and having a portion of one of the chamber walls movable to uncover an opening through which a roast on the spit may be inserted or withdrawn from the chamber.

15. An apparatus in accordance with claim 12 having the electrical heating elements constructed and arranged to provide heat sources at a plurality of positions above and at the sides of the spit.

DANIEL G. NELSON.